Figure 1:
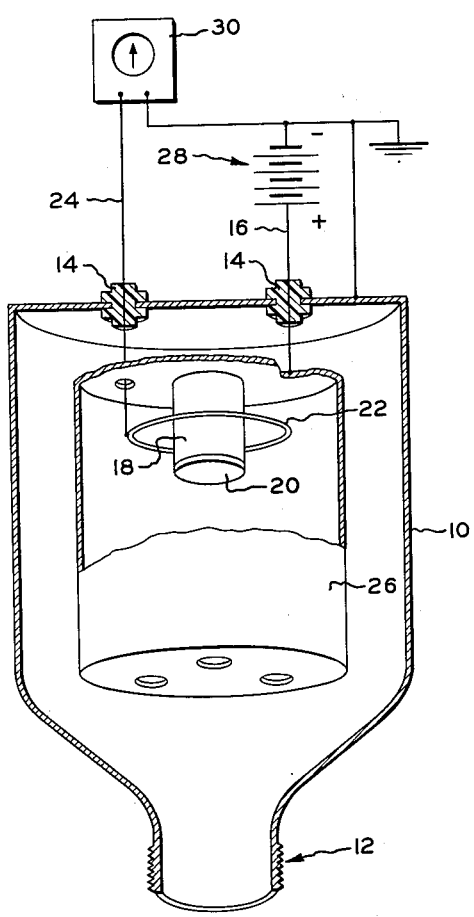

United States Patent Office 2,993,137
Patented July 18, 1961

2,993,137
BETA PARTICLE IONIZATION GAUGE
Jonathan R. Roehrig, Sudbury, and George F. Vanderschmidt, Belmont, Mass., assignors to National Research Corporation, Cambridge, Mass., a corporation of Massachusetts
Filed Aug. 6, 1957, Ser. No. 676,653
2 Claims. (Cl. 313—7)

This invention relates to vacuum gauges operating on the ionization principle. More specifically it concerns ionization by a specific product of radioactive decay, beta particles.

Ionization vacuum gauges operate on the principle that the number of ions produced when a definite volume of gas is subjected to a stream of ionizing particles is directly dependent on the number of molecules of a gas present in the definite volume. This relation can be observed only when all of the energy of the ionizing particles is not absorbed by the gas. This necessarily requires that some of the ionizing particles must impinge upon the sides of the chamber defining the volume, the effect of which will be considered hereafter.

Also necessary to obtain a measurable relation is a constant known quantity of ionization particles. Expensive equipment necessary for the electrical production of ionizing particles in a constant stream and the limitations on the maximum pressure measurable by hot filament gauges, commensurate with reasonable filament life, has led to the use of the products of radioactive decay as sources of ionizing particles. For these reasons radium has been used in gauges very successfully. There are, however, limitations in gauges using radium as a source of ionizing particles. To obtain a measurable ion flow necessary to indicate the number of molecules present, there must be a definite number of ions collected. Economical electrical sensing equipment indicates minimum measurable electrical flow to be on the order of $10^{-13}$ amperes. The creation and collection of ions necessary to maintain this current is dependent upon the number of molecules present and the number of ionizing particles passing through the gas. Where there are few molecules present it follows that a larger number of ionization particles is necessary to maintain the minimum current.

The usefulness of alpha particle emitters as sources for ionizing particles is limited by the effect of the attendant gamma rays. Where large numbers of ionization particles are necessary a large amount of radium or other comparable alpha emitter commercially useful must be present. Alpha emitters, however, also produce gamma rays, and as the amount of material is increased a serious health hazard is created. Moreover, gamma radiation causes a detrimental effect on the sensing equipment. The gamma rays and alpha particles striking the collector eject electrons therefrom. Gamma rays striking the walls of the chamber cause X-ray fluorescence. Some X-rays thus created impinge on the collector, also ejecting electrons. Such losses of electrons cause "dark current," i.e. electrical current which is not related to the number of ions created in the chamber. Where this dark current can not economically be compensated for, an accurate measurement of pressure by radioactive ionization is not practicable. Hence, the usefulness of radium or alpha emitters in general is governed by the pressure at which the gamma rays attendant with an amount of alpha particles adequate to create detectable ionization creates a serious health hazard or dark current effect which impairs the accuracy of the measurement of the ion current produced. A further limitation on the use of such emitters independent of the effects noted above is the high cost of quantities of alpha particle emitters sufficient to produce adequate ion currents at the low pressures. For these reasons no alpha emitter ionization gauge for detection of pressure below $10^{-2}$ mm. Hg at full scale has been deemed commercially practicable. Like difficulties are encountered in the use of beta emitters which have attendant gamma radiation causing dark current effects and a hazard to health.

Additional detrimental dark current effects are experienced outside the actual ionization chamber whenever there is intense gamma radiation. These effects are noted primarily in the amplifying system and the electrical leads connected thereto. For instance, in a commercially available gauge the grid lead of the input tube of the amplifier, running from the ionization gauge, is exposed to the atmosphere. There are, therefore, a great number of gas molecules surrounding the lead. The gamma rays ionize those molecules and create positive ions which are collected on the lead thus creating dark current.

The object of this invention is to provide an ionization vacuum gauge, utilizing radioactive material as the source of ionizing particles, capable of measuring pressures from atmospheric to $10^{-5}$ mm. Hg abs. and lower.

Another object of this invention is to provide such an ionization gauge which can be more economical to produce than other known types of gauges used to measure such pressures.

The objects of this invention are realized by utilizing radioactive material meeting specific standards heretofore not met by material used in radioactive material ionization gauges.

It was found that the detrimental dark current caused by gamma rays could be avoided by using radioactive material which emits beta particles without gamma radiation. The effect of X-ray production is minimized by utilizing extremely low energy beta particles which minimize the intensity of X-ray emission from the walls of the chamber; the dark current from the collector is correspondingly reduced.

Figure 3:
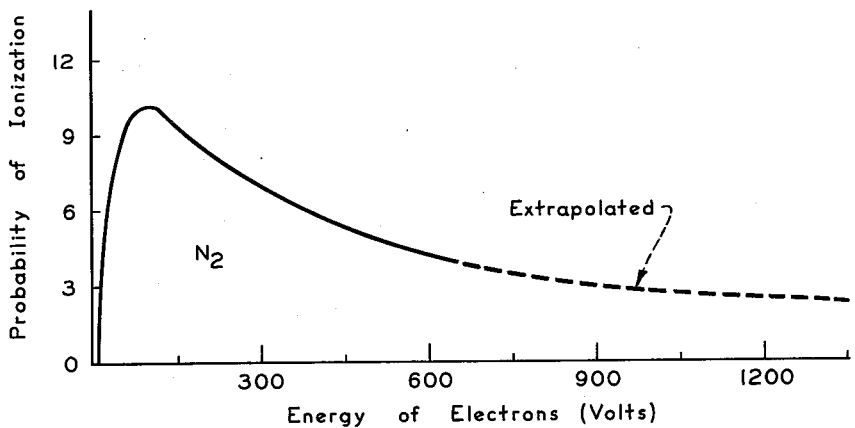

The performance observed in using low energy beta particles is much more favorable than that expected through the minimization of X-ray production alone. In the use of beta particle emitters a factor influencing the number of ions created apart from the number of ionizing particles present is of importance, i.e. the probability of ionization by electron collision with a molecule of the gas the pressure of which is to be measured. In a gauge with a given beta particle path length through which ionization may occur, as fixed by the volume of the gauge, this probability factor is dependent upon the energy of the ionizing electron. In FIGURE 3 this probability is indicated for given particle energy from 0 to over 1000 ev. particle energy.

Figure 4:
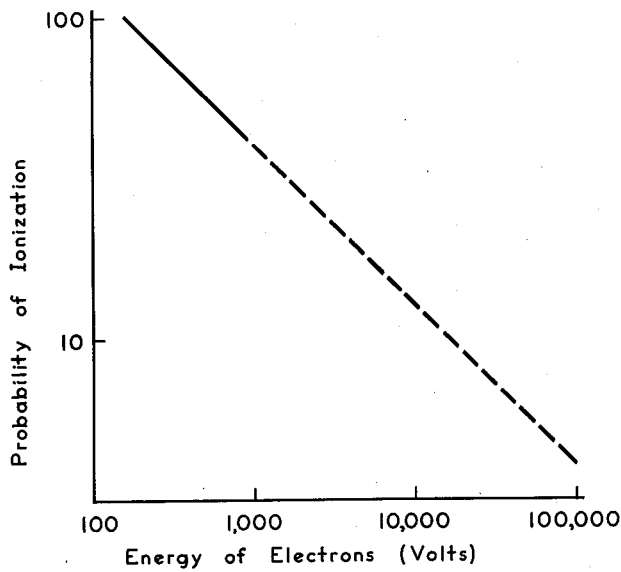

In the energy range of beta particles the probability of ion creation has been determined to decrease with the increase of particle energy roughly in proportion to $1\sqrt{V}$ where V is the energy. This relation is exemplified by the curve set forth in FIGURE 4 which indicates the decrease in probability of creation of ions (plotted as ordinate) as the particle energy increases (plotted as abscissa) for the range of energy of .1 to 100 kev.

By utilizing as a source of ionization particles a radioactive material emitting low energy beta particles a vacuum gauge can be created to measure pressures below the range of any radioactive material ionization gauge heretofore known. To realize appreciable benefit from the increased ionizing quality of low energy particles as compared to those from strontium for instance, emitters are to be selected yielding very "soft" beta particles with energy not in excess of 20,000 electron volts.

By selecting for the gauge the radioactive material tritium which emits low energy beta rays (maximum particle energy 18 kev.) without either attendant gamma rays or alpha particles, accurate measurement of pressures from atmospheric down to $10^{-5}$ mm. Hg has been achieved using ionizing radiation of .1 curie of tritium. This gauge has a commercially competitive cost as compared with other types of gauges and provides a minimization of health hazard, resulting from the elimination of gamma rays and a minimization of secondary emission X-rays. For a given activity, e.g. one curie, the instantaneous ionizing capabilities of low energy beta particle emitters is very high resulting in efficient use of the material. Efficiency is important in producing competitive designs of gauges, all of which have a limited space available for containing the radioactive material.

The amount of radioactive material necessary to produce a measurable ion current, i.e. ion current on the order of $10^{-13}$ amperes, at a given pressure with beta particles of a given energy is dependent on the distance the beta particles travel in the chamber in which the gas, the pressure of which is to be measured, is contained. This distance directly affects the amount of ionization. Chambers with dimensions in excess of around 20 cm. are impractical from a manufacturing standpoint and in light of the desire of compactness for ease in handling. Moreover, large volume gauges necessarily increase the volume required to be pumped down to attain a vacuum which affects the entire pumping system requirements.

In using tritium as the source for the measurement of pressures on the order of $10^{-5}$ mm. Hg it has been determined that at least $10^{-3}$ curies of tritium are required in view of the design criteria.

One of the factors affecting cost of pile-produced radioactive material is the life thereof, for the production of long half-life material requires long exposure to bombardment in the pile as compared with material of shorter half-life. It is therefore preferred that short half-life material be utilized. To provide a source with substantially constant emission however, material with half-life of less than 5 years is not practicable.

With these considerations in mind as well as the present availability of the radioactive material in a form suitable for use in vacuum gauges the pure beta particle emitter tritium with a half-life of 12 years in the preferable form of a combination of tritium with zirconium appears presently to be the best material suited for use in the ionization gauge of this invention. It should be noted, however, that this invention is not limited to tritium but includes all low energy beta emitters as defined by the physical characteristics required in this specificaiton. The material used at any time will depend on the cost.

Figure 2:
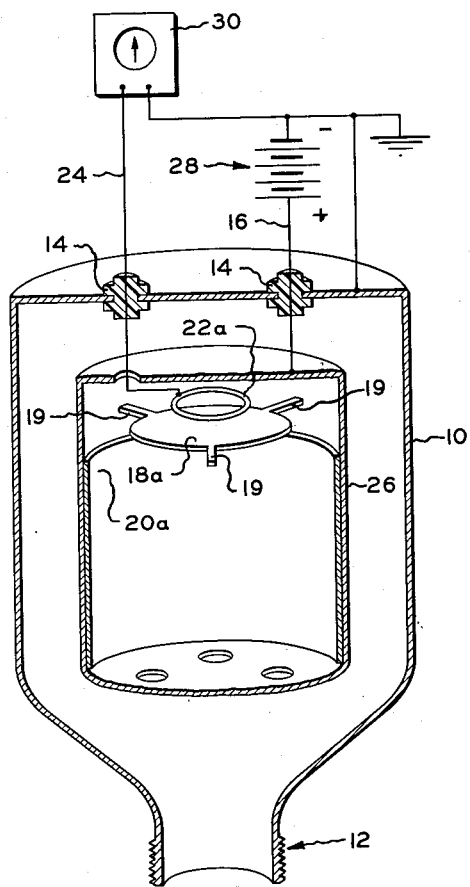

Referring now to FIGURES 1 and 2 wherein like numbers refer to like elements in these figures, ionization gauges utilizing this preferred material will be described. The graphs of FIGURES 3 and 4 have previously been described.

In FIG. 1 there is shown one preferred embodiment of the invention. An outer conductive cylindrical chamber 10 defines a vacuum tight volume used to contain the gas the pressure of which is to be measured and serves to shield the volume therein contained from the outside electrical effects. The chamber is provided with a mechanical coupling 12 for connection to a system at the point where a pressure measurement is desired.

Vacuum tight seals 14 are provided in the top of the chamber. Through one of the vacuum tight seals 14 there extends into the chamber a supporting wire 16 to which there is connected electrically a shield 18 in the form of a pedestal. The pedestal is preferably made of copper upon which is fixed in electrical contact a placque 20 which has been coated with zirconium metal impregnated with tritium. A positive ion collector 22 in the form of a ring is attached to a wire 24 in a spaced relationship to the shield 18. With this arrangement the ring is not in the line of sight of the portion of the pedestal upon which the placque 20 is fixed so that direct radiation from the placque does not bombard the collector ring. The placque is maintained at an electric potential only for the purpose of precluding the build up of a charge thereon which would deflect the beta particles emitted from the placque. The shield 18 and placque 20 combination is maintained at a positive potential of around 150 volts by the supporting wire 16 extending into the chamber through one of the seals 14. In electrical contact with the shield 18 is an electron collector 26 in the form of a cylindrical metal conductor in a substantially concentric relationship with the outer chamber 10. This electron collector being maintained at a positive potential receives the electrons produced by the ionization, and the beta particles that have traversed the gas.

The positive ion collector 22 is maintained at a potential negative in relation to the electron collector 26 and serves to collect the positive ions produced by the ionization. A suitable power source such as a battery 28 is provided in circuit between wires 16 and 24 to maintain this electrical relationship. Also, in this circuit is a high resistance electrometer 30 provided to measure the ion current produced and thus measure the pressure.

The outer conductive cylindrical chamber 10 is grounded and thus serves as a shield to protect the sensing equipment comprising the collectors 22 and 26 from outside electrical effects.

FIG. 2 presents another preferred embodiment of the invention varying from that in FIG. 1 in that the placque $20_a$ is in the form of a foil in intimate contact with the electron collector 26. The positive ion collector $22_a$ is in the form of a ring and the shield $18_a$ is attached to the electron collector 26 by supporting struts 19.

In utilizing tritium as the source of beta particles, for instance, and comensurate with chemical and physical stability at the temperature conditions anticipated, any material which will hold tritium can be used in this invention. A preferred embodiment utilizes zirconium tritide. Titanium tritide can also be used as well as any other metal in which hydrogen (tritium) is appreciably soluble or with metal with which is chemically combines provided that that the material will not decompose or voltailize at the high vacuum employed in the gauge. Even water containing tritium could be used if a vapor tight container could be devised which would not absorb the emitted beta particles. It is, however, preferred for ease in construction that the radioactive material be embodied in a metal foil which is, by its nature, easily mounted in an ionization gauge.

What is claimed is:

1. In an ionization gauge a radioactive plaque and support means therefor, said plaque and said support means coacting to define a radiation exposed volume and a non-radiation exposed volume having a common boundary, a collector electrode surrounding an axis perpendicular to said plaque and disposed within said non-radiation-exposed volume and immediately adjacent said common boundary.

2. In an ionization gauge of the type wherein a positive ion current corresponding to the degree of ionization of a gas in a vacuum tight chamber is measured to obtain an indicaiton of the density of the gas and a radioactive material is employed as the source of ionizing particles, the improvement which comprises a source of ionizing particles consisting of tritium, said tritium being chemically combined with a mechanical support and being present in a sufficient area to produce an ion current of at least $10^{-13}$ amperes at a pressure of $10^{-5}$ mm. Hg abs. in air, said tritium being present on one surface of said mechanical support in position to emit high-energy electrons into a predetermined volume of said chamber, said collector being positioned near said support and outside said volume, the collector being immediately adjacent one boundary of said volume and in free and unobstructed communication with said volume to attract and collect a substantial number of the positve ions created in said volume, said collector being in the form of a ring element concentric with a pedestal which serves as said mechanical support and which supports said tritium source on an end thereof.

References Cited in the file of this patent

UNITED STATES PATENTS

| | | |
|---|---|---|
| 2,497,213 | Downing | Feb. 14, 1950 |
| 2,689,918 | Youmans | Sept. 21, 1954 |
| 2,700,110 | Shamos | Jan. 18, 1955 |
| 2,718,786 | Ohmart | Sept. 27, 1955 |
| 2,739,283 | Roehrig | Mar. 20, 1956 |
| 2,804,573 | Arrol et al. | Aug. 27, 1957 |

FOREIGN PATENTS

| | | |
|---|---|---|
| 748,906 | Great Britain | May 16, 1956 |